Werner H. Wiesinger
INVENTOR

BY Eugene D. Farley

Atty.

July 4, 1967 W. H. WIESINGER 3,329,182
MULTIPLE, STRAIGHT LINE ROTARY SAW ASSEMBLY
Filed June 14, 1965 2 Sheets-Sheet 2

Werner H. Wiesinger
INVENTOR
BY
Atty.

3,329,182
MULTIPLE, STRAIGHT LINE ROTARY SAW ASSEMBLY
Werner H. Wiesinger, P.O. Box 463, Tillamook, Oreg. 97141
Filed June 14, 1965, Ser. No. 463,529
2 Claims. (Cl. 143—49)

This invention pertains to multiple, straight-line rotary saws. It pertains particularly to multiple, straight-line rotary saws including a novel feed chain assembly.

It is the general object of the present invention to provide a rotary saw, particularly a multiple, straight-line rotary saw, equipped with a feed chain assembly which is guided positively into proper relation with the saws, which is remarkably free from wear problems, which is operable at high speed with attendant increased capacity, and which is operable with minimum expenditure of power.

Figure 1:
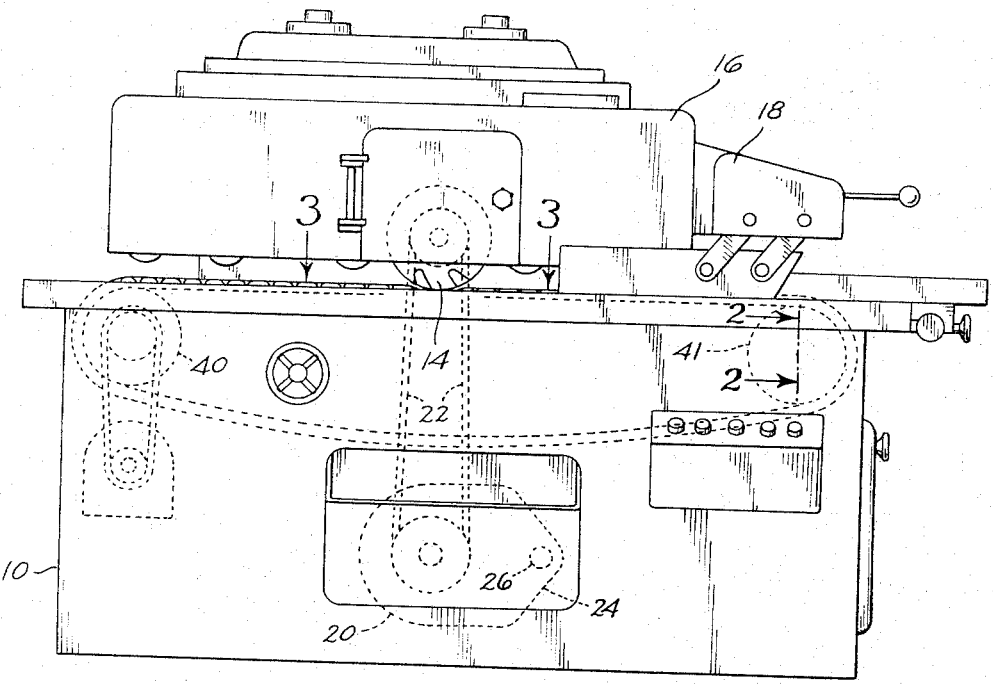
FIG. 1 is a view in side elevation of the rotary saw of my invention.

As shown in FIG. 1, the saw of my invention includes a base 10 which supports the usual flat saw table 12. A multiple saw head 14 is supported in operative position above the table in roller carriage 16. The base also supports an anti-kick back assembly 18.

Saw head 14 is driven from a motor 20 through belt 22. The motor is mounted in the usual way between a pair of plates 24, one of which is pivoted to pin 26.

A pair of spaced, parallel support blocks 30 extend longitudinally of table 12, centrally thereof. The support blocks in turn support a pair of spaced, parallel, guide rails 32.

A pair of cams 34 are arranged flush with the table top, one on each side of the rails. These members of the assembly comprise flat plates which extend the length of the table. Their function is to guide the feed chain so that it passes in proper position with reference to the saw.

Each cam accordingly has a thickened central portion 36 immediately opposite the saw. This portion serves the purpose of guiding the feed chain away from the saw so that it does not interfere with the saw operation.

So much of the saw assembly is conventional. As will be seen from FIGS. 2-5, however, the saw includes a novel feed chain assembly, indicated generally at 38. This assembly rides on rails 32, FIG. 2, and is supported at one end by a drive sprocket 40 and at the other end by an idler sprocket 41.

The feed chain assembly includes a plurality of chain links 42. Each link comprises a short, flat bar, preferably having a roughened exterior. The two side margins of the bar mount integral knuckles 44, 46 respectively. Knuckles 44 are on the leading margin and knuckle 46 is on the trailing margin of the bar.

Links 42 are arranged side by side in the chain with the knuckles of each link being interleaved in aligned, hinge-forming relation with the knuckles of the adjacent links.

A freely floating pin 50 is disposed in each set of aligned knuckles. The pin is of sufficient length to extend outwardly beyond the planes of the ends of the links to a location which is beneath the under surface of cam plates 34, on each side.

The outwardly projecting ends of pins 50 each support a pair of freely rotatable rollers arranged side by side and indicated at 52, 54.

Inner rollers 52 are dimensioned to mesh with the teeth of sprockets 40, 41. Outer rollers 54 comprise cam rollers which track on the under surfaces of cam plates 34. Both are hardened and ground.

Rollers 52, 54 thus are present at the locations of maximum wear of the feed chain assembly, i.e. at the point of contact with the sprocket teeth and the point of contact with the cam plates. Since they are freely rotatable, and since pin 50 on which they are mounted floats freely, areas of excessive unequal wear substantially are eliminated.

Retainer means are provided for retaining in operative position floating pins 50 and freely rotatable rollers 54 mounted thereon.

Figure 2:
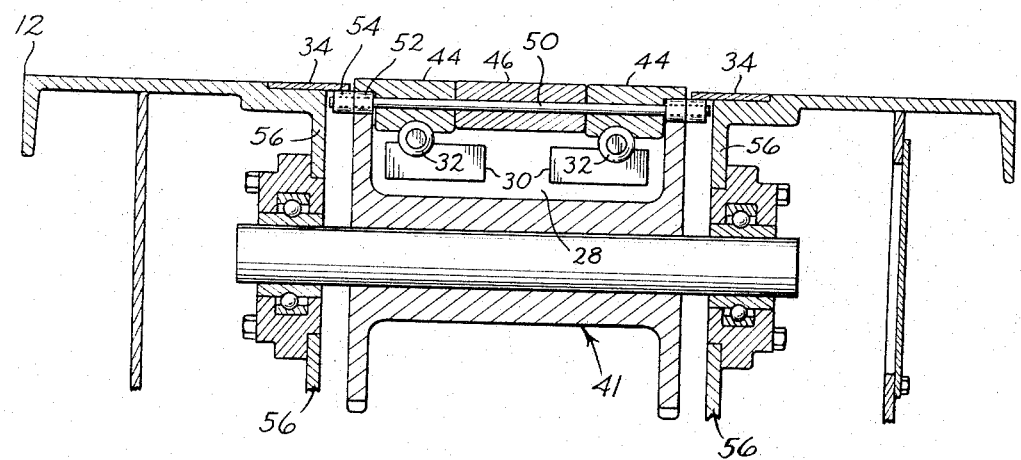
FIG. 2 is a transverse sectional view taken along line 2—2 of FIG. 1.
Figure 3:
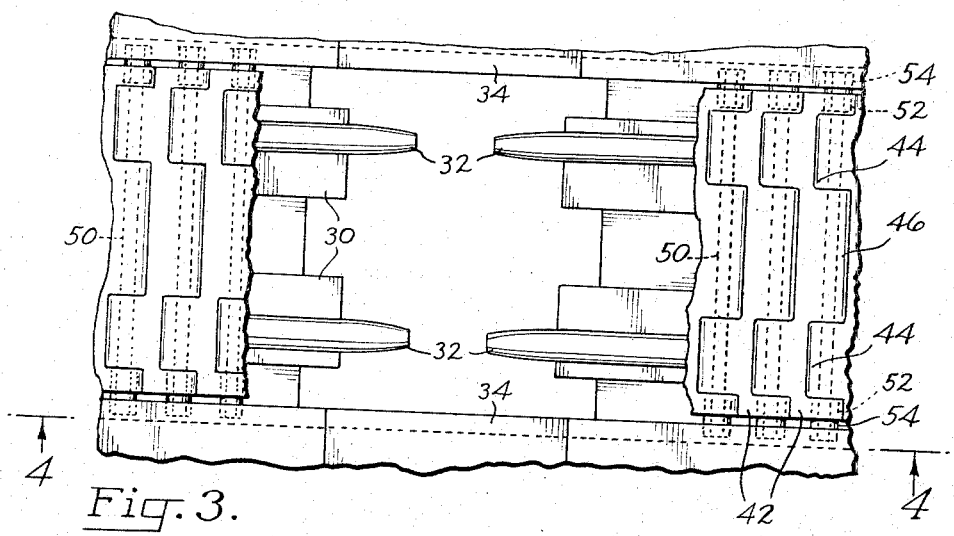
FIG. 3 is a fragmentary plan view, partly broken away, illustrating the construction and manner of mounting of a novel feed chain assembly employed in the saw of FIGS. 1 and 2.
Figure 4:
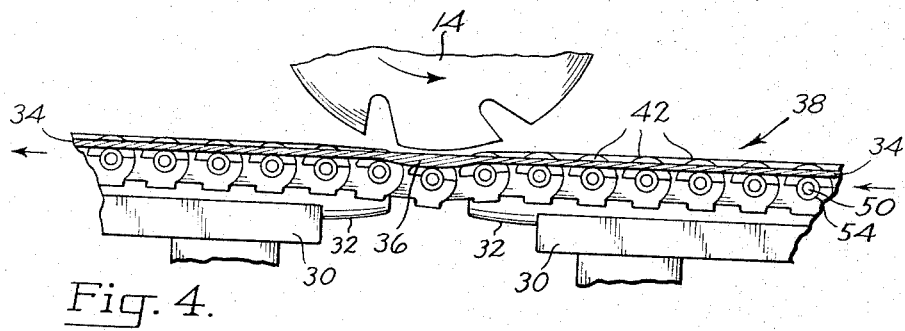
FIG. 4 is a fragmentary longitudinal sectional view taken along line 4—4 of FIG. 3.
Figure 5:
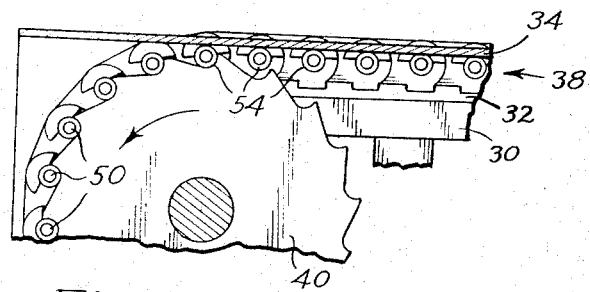
FIG. 5 is a fragmentary sectional view of the feed chain assembly of FIGS. 3 and 4, illustrating further the manner in which it is mounted and driven.

In the illustrated form of the invention, the retainer means comprise abutments, positioned one on each side of the feed chain and spaced a predetermined distance from the ends of the pins. This distance is sufficient to provide clearance for movement of the chain, but insufficient to permit displacement of the pins and of the rollers which they mount. As shown in FIG. 2, the abutments preferably comprise plates 56 arranged vertically and extending longitudinally of the saw.

The construction thus described is characterized not only by the advantage of freedom from wear, but also by the capability of operation at a speed so high that the capacity of the saw is increased substantially.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be restorted to without departing from the spirit of my invention or the scope of the subjoined claims.

Having thus described my invention, I claim:

1. In a rotary saw including a saw table, a rotary saw mounted above the table, a feed chain guide arranged longitudinally of the table beneath the saw, a drive sprocket and an idler sprocket rotatably mounted at the respective ends of the guide, and elongated cams supported one on each side of the guide: an endless feed chain assembly reeved about the sprockets with its upper stretch supported on the guide, the assembly comprising:

(a) a plurality of links arranged side by side in chain-forming relation, each link having a plurality of knuckles on its leading and trailing margins, (b) the knuckles of each link being interleaved in aligned, hinge-forming relation with the knuckles of the adjacent links,
(c) a freely floating pin disposed in each set of aligned knuckles and extending outwardly beyond the planes of the ends of the links adjacent the cams,
(d) a pair of rollers rotatably mounted side by side on each end of each pin,
(e) one roller of each pin being positioned for engagement by the sprockets and the other roller of each pair being positioned for tracking on the adjacent cam, and
(f) retainer means for retaining the pins in the knuckles and the rollers on the pins.

2. The feed chain assembly of claim 1 wherein the retainer means comprises abutment means spaced from but adjacent the ends of the pins for preventing their longitudinal displacement.

References Cited
UNITED STATES PATENTS

| | | |
|---|---|---|
| 2,053,915 | 9/1936 | Mattison. |
| 2,198,036 | 4/1940 | Isted. |
| 2,664,927 | 1/1954 | Pierce _____ 143—49 |

WILLIAM W. DYER, JR., *Primary Examiner.*

W. D. BRAY, *Assistant Examiner.*